(12) United States Patent
Liao

(10) Patent No.: US 8,409,709 B2
(45) Date of Patent: Apr. 2, 2013

(54) COMPOSITION OF HYDROPHOBIC GRANULAR PLAY MATERIAL AND ITS METHOD OF MANUFACTURE

(76) Inventor: Chu-Yuan Liao, Taipei (TW)

( * ) Notice: Subject to any disclaimer, the term of this patent is extended or adjusted under 35 U.S.C. 154(b) by 322 days.

(21) Appl. No.: 12/772,189

(22) Filed: May 1, 2010

(65) Prior Publication Data

US 2011/0268971 A1 Nov. 3, 2011

(51) Int. Cl.
*B32B 5/16* (2006.01)
(52) U.S. Cl. ........................................ 428/403; 428/407
(58) Field of Classification Search ........... 428/403–407
See application file for complete search history.

(56) References Cited

U.S. PATENT DOCUMENTS

| | | | | |
|---|---|---|---|---|
| 6,311,773 B1 * | 11/2001 | Todd et al. | ................. | 166/280.2 |
| 7,178,596 B2 * | 2/2007 | Blauch et al. | ............... | 166/280.2 |
| 7,713,599 B2 * | 5/2010 | Watanabe et al. | .......... | 428/32.21 |
| 8,227,026 B2 * | 7/2012 | McDaniel et al. | ............ | 427/212 |

* cited by examiner

*Primary Examiner* — Leszek Kiliman
(74) *Attorney, Agent, or Firm* — LaHork & Associates P.C.

(57) ABSTRACT

A hydrophobic granular play material comprised of a multitude of engineered particle structures. The particle structures have an average maximum diameter of less than three millimeters. Each particle structure has an inner core of first material that is coated with a hydrophobic composition. The inner core can be particles of natural sand, plastic, or polyfoam. The inner core is enveloped in a composition of a cured elastomeric gel. The gel is hydrophobic. However, the elastomeric gel does exhibit adhesion to itself. Consequently, the particles coated in the elastomeric gel repel water but lightly adhere to each other when compressed together. The particle structures of the play material can therefore be compressed into shapes in the same manner as natural wet sand.

13 Claims, 3 Drawing Sheets

COMPOSITION OF HYDROPHOBIC GRANULAR PLAY MATERIAL AND ITS METHOD OF MANUFACTURE

BACKGROUND OF THE INVENTION

1. Field of the Invention

In general, the present invention relates to granular modeling materiel, such as play sand, that can be pressed together to form three-dimensional structures. More particularly, the present invention relates to granular modeling material made from polymer-coated particles.

2. Prior Art Description

People have played with beach sand and formed beach sand into structures throughout history. Beach sand has many characteristics that make it fun to play with. Sand is generally soft when loose, yet it can be manually compacted into hard dense formations. Furthermore, moist particles of sand tend to adhere to each other when compacted. Accordingly, three-dimensional structures can be easily made from compacted sand. It is because of the high play value of sand that many parents, day care centers, and community parks erect sand boxes in which children can play.

Although natural sand has many characteristics that add to its play value, natural sand also has certain unfavorable characteristics. For example, natural sand is highly abrasive. As such, natural sand can quickly scratch floors and mar furniture if it comes into contact with such objects. Sand also has a tendency to disrupt mechanical movements found in appliances, toys, electronic gadgets, and the like. Lastly, natural sand absorbs water and takes a long time to dry once it has absorbed water. Consequently, natural sand can readily harbor many contaminants, such as microbial life, that can thrive in moist sand.

In an attempt to reduce the negative characteristics of natural sand, manufacturers have begun to create artificial sand. Artificial sand is made from polymer compositions and tends to be hydrophobic. Accordingly, artificial sand dries quickly and tends not to adhere to most objects, such as skin. Furthermore, artificial sand is polymer-based and is far less hard and/or abrasive than is natural sand. Although artificial sand is softer and cleaner than natural sand, the particles of artificial sand tend not to cling together in the same manner as natural sand. Consequently, it is harder to compress artificial sand into structures that maintain their form. It is because of this characteristic that artificial sand is often played with underwater. Under water, the pressure of the water presses the particles of artificial sand together and enables the artificial sand to maintain complex shapes. However, once the artificial sand is lifted out of the water, the various particles fall away and the structure of any form is lost. A commercially sold example of such artificial sand that is intended to be played with underwater is sold under the name Aqua Sand® by Spin Master, Inc of Ontario, Canada.

A need therefore exists for an artificial sand composition that is hydrophobic, yet exhibits some particle adhesion characteristics in dry air. In this manner, forms can be created from the artificial sand in ambient air. This need is met by the present invention as described and claimed below.

SUMMARY OF THE INVENTION

The present invention is a hydrophobic granular play material comprised of a multitude of engineered particle structures. The particle structures have an average maximum diameter of less than three millimeters. Each particle structure has an inner core of first material that is coated with a hydrophobic composition. The inner core can be particles of natural sand, plastic, or polyfoam. The inner core is enveloped in a composition of a cured elastomeric gel. The gel is hydrophobic. However, the elastomeric gel does exhibit some adhesion to itself. Consequently, the particles coated in the elastomeric gel repel water but lightly adhere to each other when compressed together. The particle structures of the play material can therefore be compressed into shapes in the same manner as natural wet sand. The shapes created are stable enough to be handles without crumbling.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

The present invention granular play material can be made in a variety of ways. The equipment and methodology being illustrated and described is merely exemplary and is set forth as the best manner of manufacture contemplated by the applicant. However, the exemplary embodiment selected for illustration is only exemplary and should not be considered a limitation when interpreting the scope of the appended claims.

Figure 1:
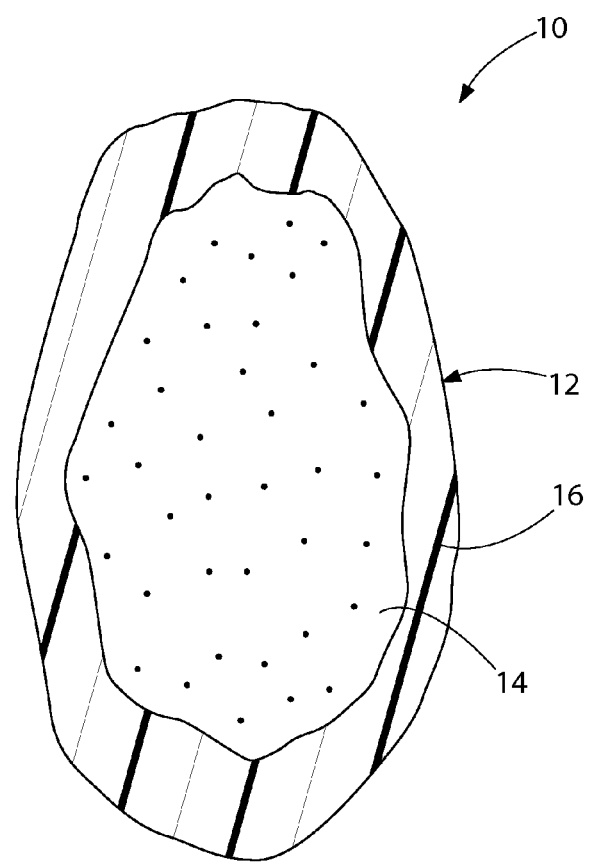
FIG. 1 is a cross-sectional view of an exemplary embodiment of an engineered particle.

Referring to FIG. 1, a cross-section of a single engineered particle 12 of play material 10 is shown. The engineered particle 12 is comprised of an inner core 14 that is surrounded by a hydrophobic coating 16. The inner core 14 can be most any granular material that is non-toxic and preferably non-dissolvable in water. Appropriate materials for the inner core include, but are not limited to, screened natural sand, hard plastic particles, soft plastic particles and polyfoam particles, such as particles of Styrofoam®.

The inner core 14 are coated in a hydrophobic coating 16 that has a preferred "A" scale durometer of between 5 and 20. However, harder and softer durometers can be used. The hydrophobicity of the hydrophobic coating 16 is high. As such, there is very little bonding with water molecules. The hydrophobic coating 16, therefore, does not readily absorb water nor does it tend to have surface adhesion to water. Consequently, the engineered particles 12 coated with the hydrophobic coating 16 dry rapidly should they ever become wet.

However, the hydrophobic coating 16 does have a relatively high degree of adhesion with itself. Consequently, when two engineered particles 12 are pressed against each other, the hydrophobic coatings 16 tend to adhere to each other. The adhesion is comparable to that of the particles of wet natural sand. Accordingly, structures made from the play material 10 will remain intact unless the structure is manually crushed or crumbled.

Figure 2:
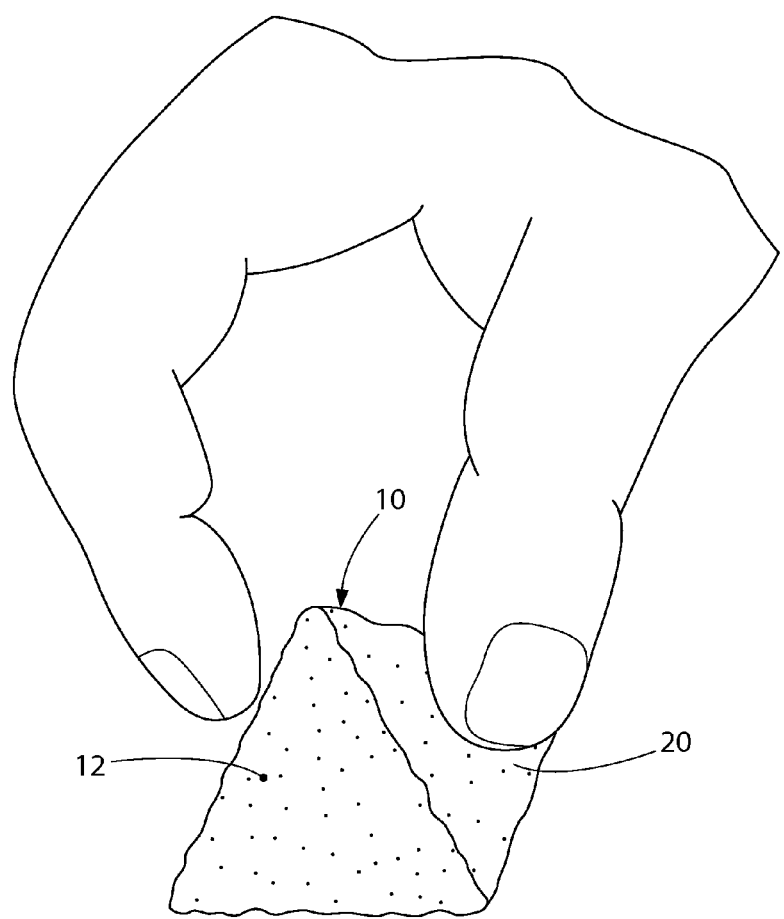
FIG. 2 is an exemplary embodiment of a structure made from engineered particles.

An example is set forth in FIG. 2. Referring to FIG. 2 in conjunction with FIG. 1, it can be seen that a structure 20 is manually formed from the play material 10. The structure 20 is illustrated as a pyramid, but can be any three-dimensional structure. Due to the surface-to-surface adhesion of the individual engineered particles 12, the structure 20 retains its shape with enough integrity to enable the structure 20 to be gently manually manipulated without damage.

Since each of the engineered particles 12 have a hydrophobic coating 16, the entire structure 20 embodies the hydrophobic characteristics of the individual engineered particles 12. The adhesion between engineered particles 12 is not created by the presence of water. Rather, the engineered particles 12 directly adhere together. The play material 10 therefore has the same moldability as wet sand while retaining no moisture. Without water, the play material does not harbor microbial contamination.

The size and weight of the engineered particles 12 can be varied by selectively controlling the density and size of the inner core 14 within each of the engineered particles 12. If it is desired for the play material 10 to feel heavy, then an inner core material such as natural sand is selected that has a density greater than that of water. Conversely, if the play material 10 is to feel light, then an inner core material such as polyfoam is selected that has a density less than that of water. It will therefore be understood that the play material 10 can be made to any desired density.

Figure 3:
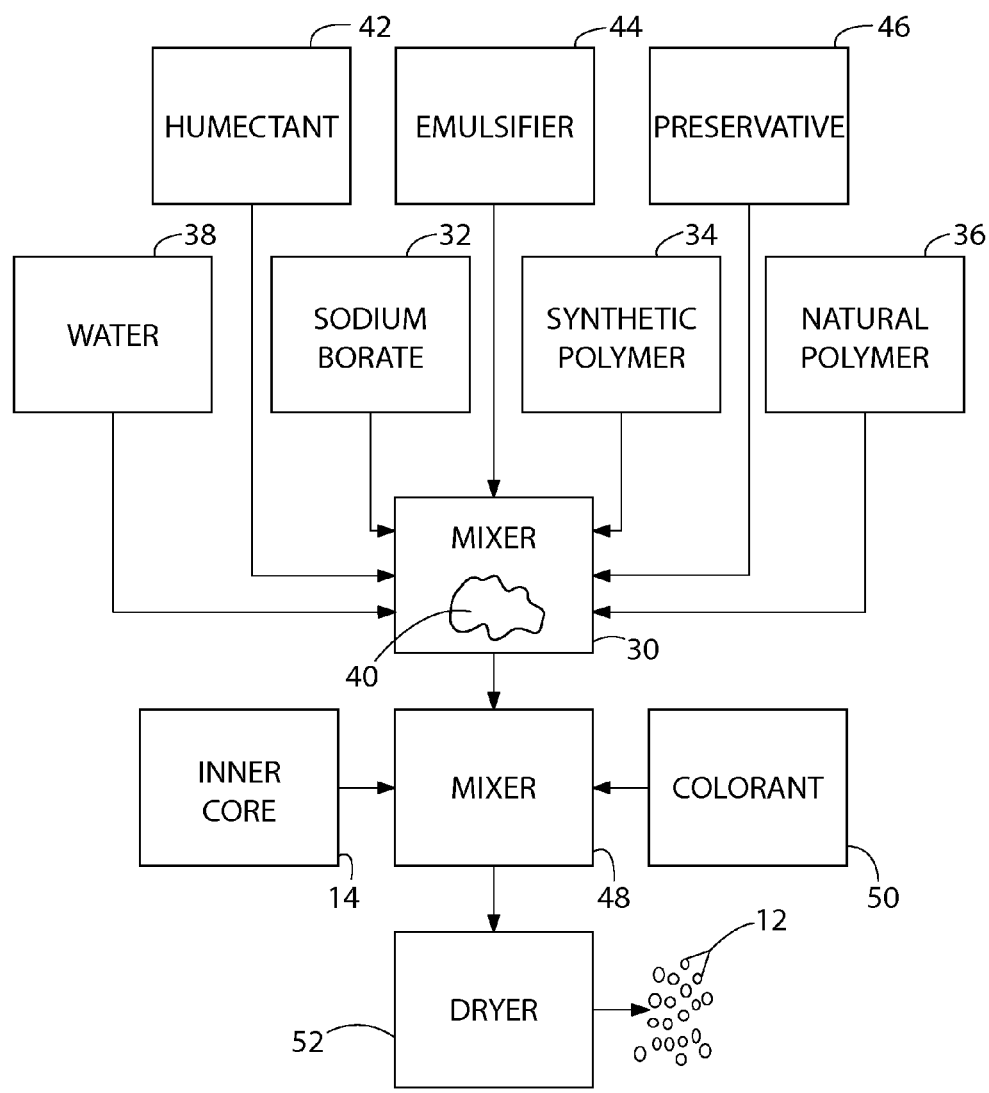
FIG. 3 illustrates and exemplary method of manufacturing engineered particles.

Referring now to FIG. 3, the method of making the engineered particles 12 is explained. In a first mixer 30, sodium borate 32 is added to a combination of a synthetic polymer 34 and a natural polymer 36. The synthetic polymer 34 is preferably polyvinyl alcohol. The natural polymer 36 is a cellulose-based polymer of linked glucose molecules. Cellulose ether is preferred, however similar polymers such as methyl cellulose can be used. Water 38 is added to the mixture. In the water 38, the sodium borate 32 reacts with the natural and synthetic polymers 34, 36 to form an uncured elastomeric gel 40. By weight, water 38 is present in an amount between 60% and 88%. The sodium borate 32 is present in the amounts between 0.5% and 2% by weight. The synthetic polymer 34 is present in amounts between 7% and 15% by weight. Lastly, the natural polymer 36 is present in amounts between 2% and 10% by weight.

A humectant 42, such as glycerin, is added to remove excess water. Depending upon the percentage of water 38 used, the humectant 42 can be present in amounts of between 1.5% and 12% by weight. Trace amounts, i.e. less than 1%, of an emulsifier 44 is added to help in the bonding of free water molecules. The preferred emulsifier 44 is sodium phosphate. Lastly, trace amounts of preservatives 46 can also be added.

Within the first mixer 30, the uncured elastomeric gel 40 is mixed and heated to promote the reaction between the sodium borate 32 and both the natural and synthetic polymers 36, 34. However, the elastomeric gel 40 is not permitted to cure. Prior to curing, the elastomeric gel 40 is introduced into a second mixer 48 with a volume of inner core particles 14. The inner core particles 14 are screened so that the particles fall within a precise particle size range. The average maximum diameter for any inner core 14 is preferably less than three millimeters. The uncured elastomeric gel 40 is mixed with the inner core particles 14 in a ratio sufficient for all of the inner core particles 14 to be well coated by the uncured elastomeric gel 40. For inner core particles 14 of natural sand, the ratio of elastomeric gel 40 to particles 14 is between 1:0.5 and 1:4.0 by weight. For inner core particles 14 of polyfoam, the ratio of elastomeric gel 40 to particles 14 is between 100:2 and 100:10 by weight. Lastly, for inner core particles 14 of plastic material, the ratio of elastomeric gel 40 to particles 14 is between 1:0.1 to 1:2.5 by weight.

A colorant 50 is added to the second mixer 48. The colorant colors both the elastomeric gel 40 and the core particles 14. In this manner, the resulting engineered particles are the same color both inside and out. After mixing, the resulting coated particles are brought to a dryer 52, such as a flat bed dryer, and are allowed to cure. This creates final engineered particles 12 that are ready for packaging and sale.

As has been previously explained, the density of the finished engineered particles 12 can be selectively varied by altering the density of the inner core particles 14. Furthermore, the degree of adhesion between the various engineered particles 12 can also be selectively varied both by altering the ratio of polymers 34, 36 to sodium borate 32 and by selectively controlling temperature and humidity during curing. As a result, the hydrophobic play material 10 can be made to have the same moldability as moist natural sand. However, less adhesive and more adhesive particle formulations can readily be manufactured.

It will be understood that the embodiment of the present invention that is illustrated and described is merely exemplary and that a person skilled in the art can make many variations to that embodiment. All such embodiments are intended to be included within the scope of the present invention as defined by the claims.

What is claimed is:

1. A granular particle structure, comprising:
   an inner core made of a first material, wherein said inner core has a maximum diameter of less than one millimeter, and wherein said first material is selected from a group consisting of particles of natural sand, plastic, and polyfoam; and
   a coating enveloping said inner core, wherein said coating includes an elastomeric gel material made from a reaction with sodium borate and at least one polymer.

2. The structure according to claim 1, wherein at said least one polymer includes a synthetic polymer and a natural polymer.

3. The structure according to claim 1, wherein said at least one polymer includes polyvinyl alcohol.

4. The structure according to claim 3, wherein said at least one polymer includes a cellulose-base polymer.

5. The structure according to claim 4, wherein said cellulose-based polymer is selected from a group consisting of cellulose ether and methyl cellulose.

6. The structure according to claim 1, wherein said coating further includes a humectant.

7. The structure according to claim 6, wherein said humectant includes glycerin.

8. The structure according to claim 1, wherein said coating further includes an emulsifier.

9. Granular play material, comprising:
   a multitude of engineered particles, said particles having an average maximum diameter of less than three millimeters, wherein each of said particles has an exterior made of a cured elastomeric gel, wherein said elastomeric gel is a result of a reaction between sodium borate and at least one polymer.

10. The material according to claim 9, wherein said at least one polymer includes polyvinyl alcohol.

11. The material according to claim 10, wherein said at least one polymer includes a cellulose-based polymer.

12. The material according to claim 9, wherein each of said particles has a core of a secondary composition.

13. The material according to claim 12, wherein said core is selected from a group consisting of natural sand, polyfoam, and plastic.

* * * * *